Oct. 17, 1933.                S. M. HAWES                 1,931,385
            CABINET FOR DELIVERING MEASURED QUANTITIES OF MATERIALS
                        Filed March 14, 1931           5 Sheets-Sheet 1
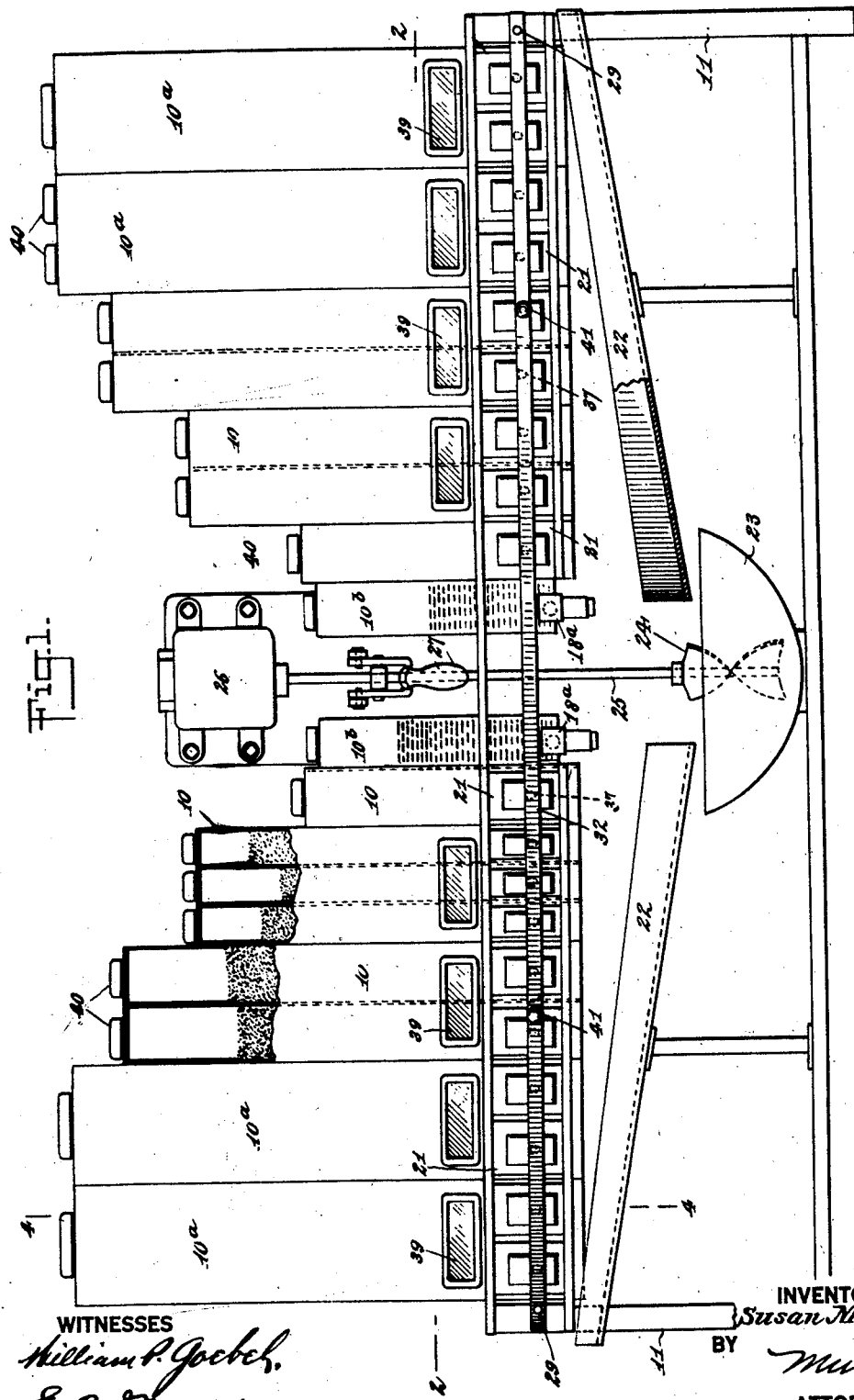
WITNESSES
INVENTOR
Susan M. Hawes
BY
ATTORNEYS

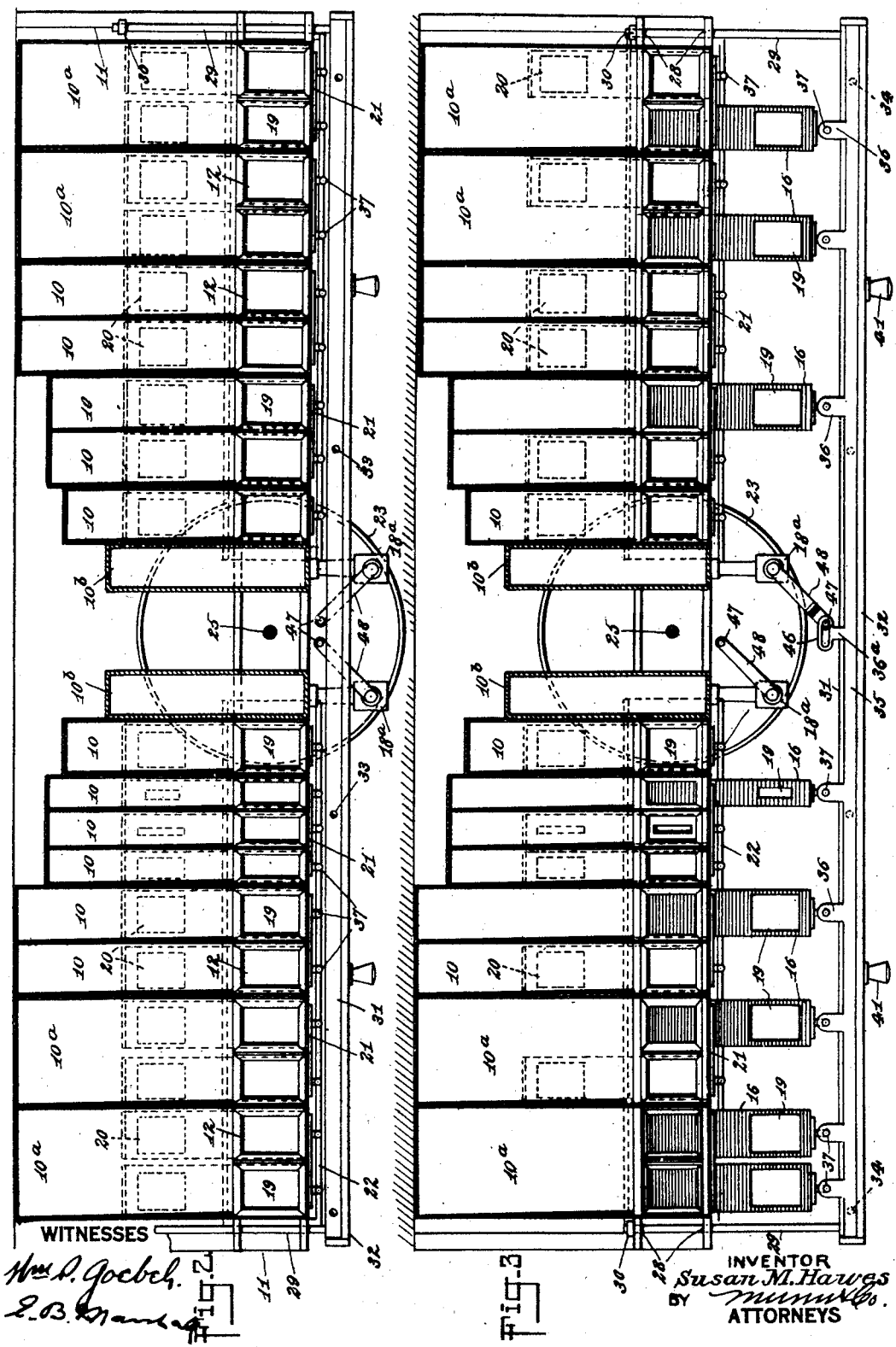

Oct. 17, 1933.   S. M. HAWES   1,931,385
CABINET FOR DELIVERING MEASURED QUANTITIES OF MATERIALS
Filed March 14, 1931   5 Sheets-Sheet 3
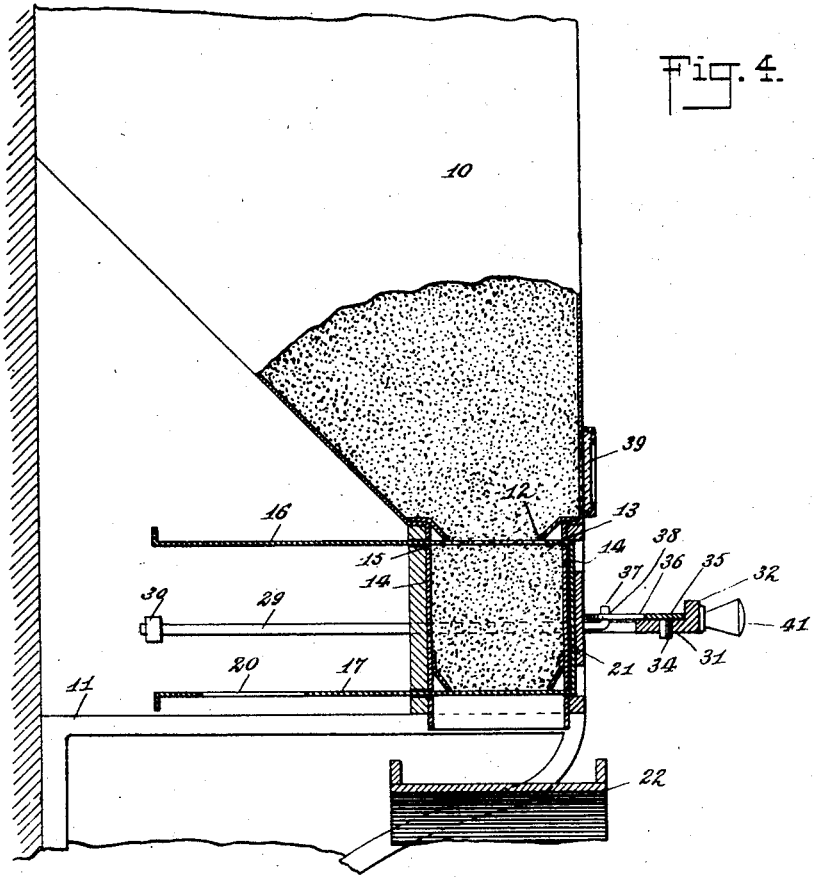
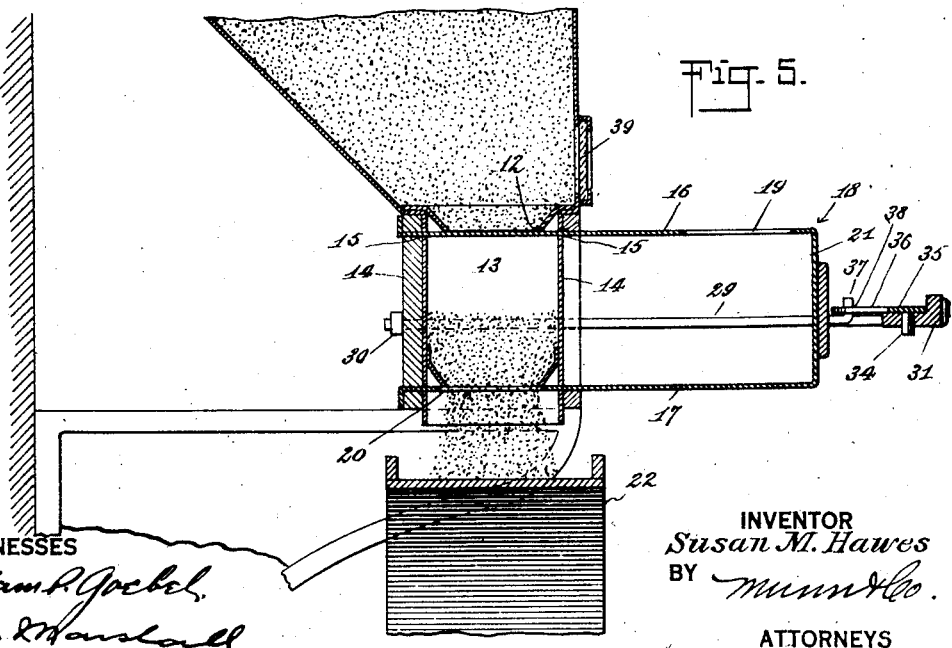
INVENTOR
Susan M. Hawes
BY
ATTORNEYS Oct. 17, 1933.     S. M. HAWES     1,931,385
CABINET FOR DELIVERING MEASURED QUANTITIES OF MATERIALS
Filed March 14, 1931     5 Sheets-Sheet 4
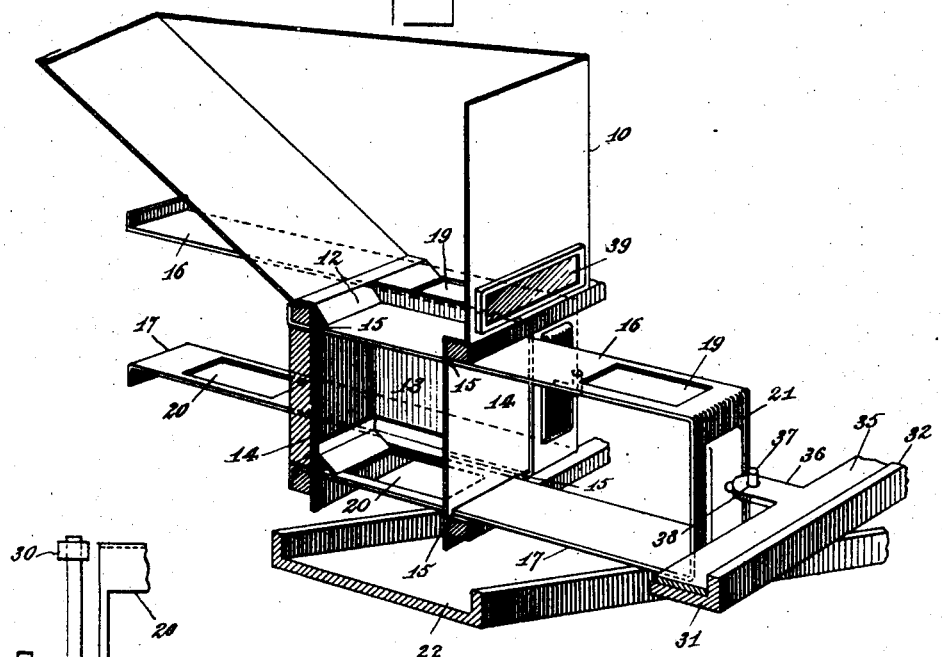
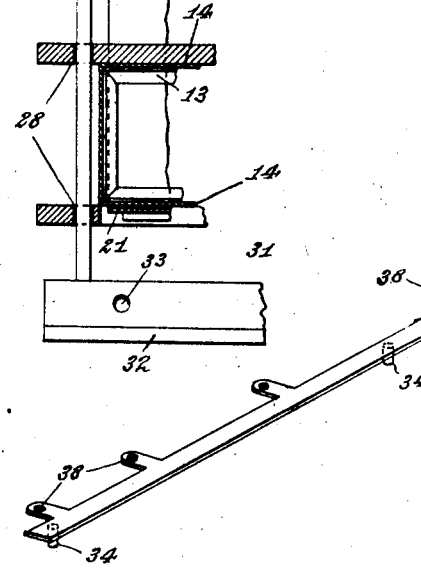
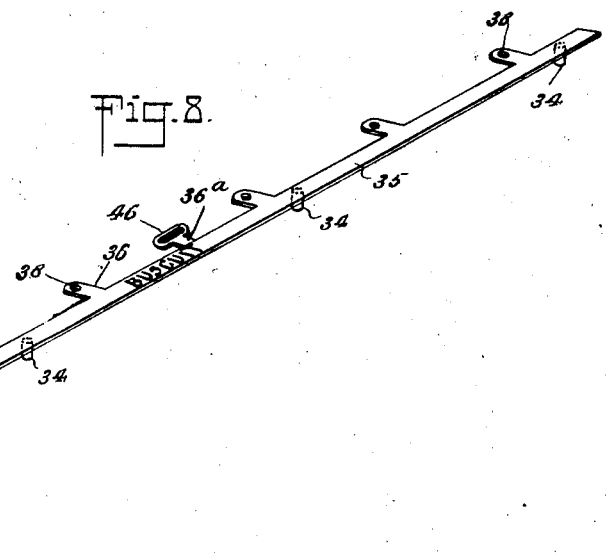
WITNESSES
INVENTOR
Susan M. Hawes
BY
ATTORNEYS Oct. 17, 1933.        S. M. HAWES        1,931,385
CABINET FOR DELIVERING MEASURED QUANTITIES OF MATERIALS
Filed March 14, 1931        5 Sheets-Sheet 5
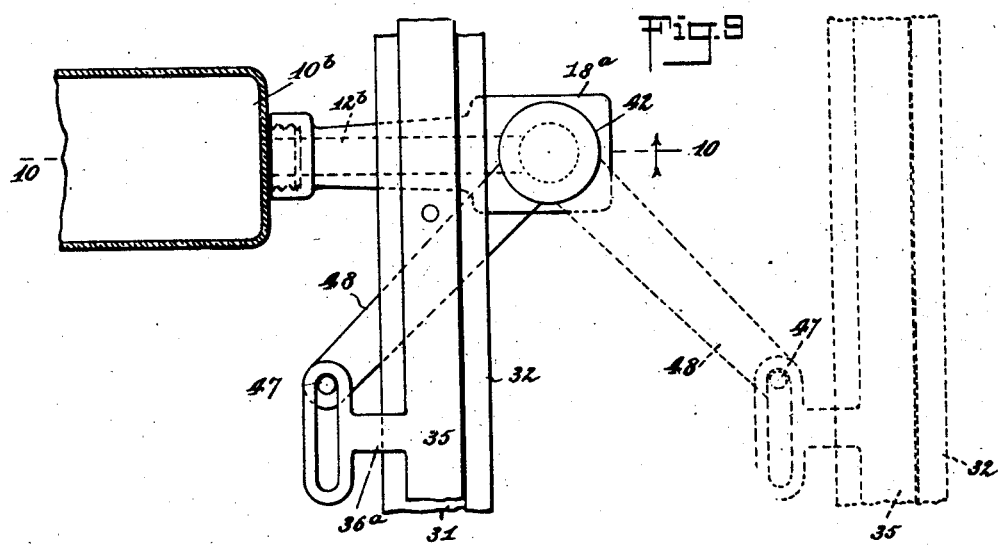
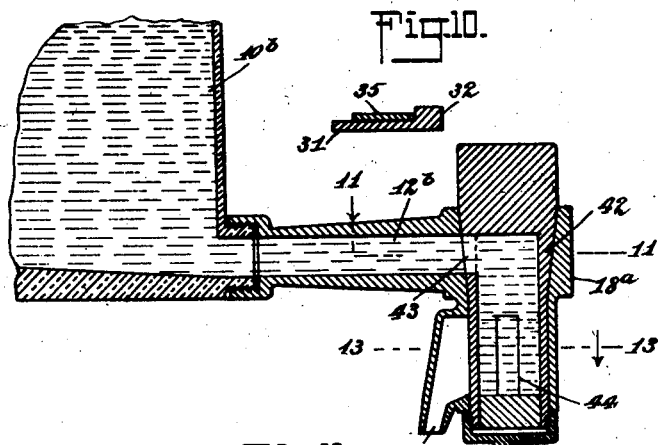
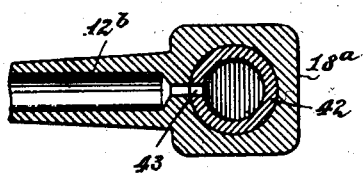
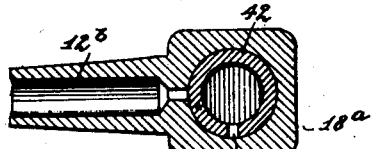
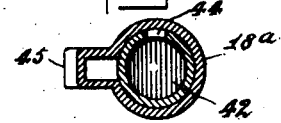
INVENTOR
Susan M. Hawes
BY
ATTORNEYS
WITNESSES Patented Oct. 17, 1933

1,931,385

UNITED STATES PATENT OFFICE 1,931,385

CABINET FOR DELIVERING MEASURED QUANTITIES OF MATERIALS

Susan M. Hawes, Morristown, N. J.

Application March 14, 1931. Serial No. 522,678

10 Claims. (Cl. 221—96)

The invention relates to cabinets, and more particularly kitchen cabinets, and it provides means for conveniently measuring materials as they are discharged from containers.

An object of the invention is to provide measuring means which has a member which when moved in one direction serves to fill a measuring compartment and when moved in another direction discharges the contents of the measuring compartment.

Another object of the invention is to provide means which may be used to discharge predetermined quantities of materials from a plurality of containers in accordance with a recipe or rule to prepare any desired mixture for making bread, cake, puddings, soups, or any other composition.

Still another object of the invention is to provide a plurality of members each fashioned to operate predetermined selected discharge outlets from containers so that one of the members may be employed to obtain from the containers all the desired quantities of materials for making bread and another member may be employed to obtain materials for another mixture. Consequently, it is unnecessary for the cook or other person to refer to a recipe or rule, for the selected member is fashioned to obtain from the containers the desired materials in given quantities as called for by the recipe or rule.

Still another object of the invention is to provide means to direct the different materials to a mixing bowl and a power means for mixing the materials in the bowl.

Additional objects of the invention will appear in the following specification in which the preferred form of the invention is described.

In the drawings similar reference characters refer to similar parts in all the views, of which Figure 1 is a front elevation partially in section showing the invention, Figure 2 is a sectional view on the line 2—2 of Figure 1, Figure 3 is a sectional view similar to that illustrated in Figure 2, but with some of the discharge outlets opened, Figure 4 is an enlarged sectional view on the line 4—4 of Figure 1, Figure 5 is a sectional view similar to the sectional view illustrated in Figure 4 of the drawings, but with the measuring compartment opened, Figure 6 is a perspective view illustrating one of the double containers with one of the discharge means opened, Figure 7 is a sectional plan view illustrating a measuring compartment and the means for supporting the operating frame, Figure 8 is a perspective view showing one of the operating bars which may be detachably mounted on the operating frame, Figure 9 is an enlarged sectional plan fragmentary view illustrating an outlet to a fluid container, Figure 10 is a sectional view on the line 10—10 of Figure 9, Figure 11 is a sectional view on the line 11—11 of Figure 10, Figure 12 is a sectional view similar to the view illustrated in Figure 11, but with the valve in another position, Figure 13 is a sectional view on the line 13—13 of Figure 10, and Figure 14 is a sectional view similar to the view illustrated in Figure 13, but with the valve in another position.

By referring to the drawings it will be seen that a plurality of containers 10, 10$^a$ and 10$^b$ are mounted on supports 11, the containers being preferably disposed in a row and being arranged as to size with reference to the material which is to be disposed in the containers, for instance, the containers which contain flour will be very much larger than the container which will contain salt. Preferably, some of the containers 10$^a$ are wider than other containers so that they will hold a considerable quantity of the material. Some of the containers, such as the containers 10$^b$, are provided for containing liquids. It will be understood that any desired number of the containers will be employed and that the containers will be selected with reference to the materials which are to be disposed therein.

At the bottom of each of the containers 10 there is an outlet 12 and the double containers 10$^a$ are preferably provided with two outlets 12, as best illustrated in Figures 2 and 3 of the drawings. The containers 10$^b$ in which liquids are disposed are provided with outlets 12$^b$. Below each outlet 12 there is a measuring compartment 13 having four walls 14 enclosing the sides thereof. Through these walls 14 and adjacent an outlet 12 there are openings 15 in the walls 14 in which are slidably disposed members 16 and 17 of the measuring device 18. The member 16 at the outlet 12 has an opening 19 adjacent its outer portion and the member 17 has an opening 20 adjacent its inner end. These members 16 and 17 are connected by a panel 21 and it will be readily understood that, when the panel 21 is pressed inwardly and the members 16 and 17 are in the positions indicated in Figure 4, the material from the container may flow into the measuring compartment and the material in the measuring compartment will be supported by the member 17.

However, when the panel is drawn outwardly, as indicated in Figure 5, the member 16 will prevent the material contained in the container from flowing into the measuring compartment, while the material which has already been disposed in the measuring compartment may fall through the opening 20 to one of the chutes 22.

The outlets 12$^b$ each leads to a measuring device 18$^a$ in which there is a valve member 42 which acts as a measuring valve, the valve member having a port 43 with which the outlet 12$^b$ communicates and a second port 44 which serves to direct the fluid from the measuring device 18$^a$ to a spout 45. It will be understood that when the valve member 42 is in the position illustrated in Figures 10, 11 and 13, the fluid may pass to the interior of the valve member 42, but that as the port 44 is out of registry with the spout 45 the fluid will not flow through the spout. However, when the valve member 42 is moved to the position indicated in Figures 12 and 14 of the drawings, the port 43 will be moved away from the outlet 12$^b$ to prevent fluid from flowing from the container 10$^b$ while the port 44 will be moved to the spout 45 to permit the fluid in the valve member 42 to flow through the spout 45.

Preferably the chutes 22 are two in number and extend from the sides of the cabinet inwardly and downwardly, terminating above a mixing bowl 23. Therefore, when one or more of the panels 21 are moved outwardly and one or more of the valve members 42 are rotated, the material contained in the associated measuring compartments will flow to the chutes 22, passing to the mixing bowl 23. Preferably disposed in the mixing bowl 23 there is a mixer 24 mounted on a shaft 25 to be rotated by a motor 26, it being possible to raise the shaft 25 and the member 24 by the lever 27. The materials which have been fed to the mixing bowl 23 may be mixed in the said mixing bowl 23 by the mixer 24 which is rotated by the shaft 25 and the motor 26.

As has been stated, the containers 10$^a$ are preferably provided each with two outlets 12 and with two measuring compartments, and the members 16 and 17 are each connected by a panel 21. This construction is advisable inasmuch as some materials will be used in larger quantities in some cases than in others, and it will be possible by operating one of the panels 21 connected with the measuring compartment at the bottom of the containers 10$^a$ to introduce into the mixing bowl 23 a predetermined quantity of the material. Should it be desired to use twice this amount of material, the two panels 21 at the bottom of the container 10$^a$ may be operated so that a greater quantity of material will flow to the mixing bowl.

In the frame there are bearings 28 in which are disposed guide bars 29 having stops 30 at their rear ends, the guide bars 29 supporting a frame 31 at the front of the cabinet. This frame 31 is preferably provided with a rail 32 and apertures 33, the apertures 33 being provided for receiving studs 34 depending from an operating bar 35. It will be understood that a plurality of these operating bars is provided, one being used for each predetermined mixture of materials contained in the containers 10, 10$^a$ and 10$^b$, the operating bar 35 illustrated in Figure 8 of the drawings having indicated thereon the word "Biscuit" so that the cook may readily select this operating bar should it be desired to make biscuits. Each operating bar 35 has fingers 36 for engaging hooks 37 on the selected panels 21, the fingers 36 having apertures 38 to receive the hooks, as illustrated in Figure 5. Certain of the operating bars 35 will also be provided with a finger 36$^a$ having extending portions 46. The fingers 36 and 36$^a$ are arranged on the operating bar 35 with reference to the particular ingredients which are to be used, and with reference to the containers in which these ingredients and materials are disposed, so that, if a predetermined combination of materials is desired this combination of materials may be obtained by providing the operating bar with fingers spaced apart and disposed to co-act with the hooks 37 operating the panels 21 to free the said materials from the containers 10 and 10$^a$ and pins 47 on operating arms 48 secured to the valve members 42 to free liquids from the containers 10$^b$.

When the desired operating bar has been mounted on the frame 31 and the frame has been drawn outwardly, as illustrated in Figures 3, 5, 6 and 7, the desired materials will pass through the openings 20 in the members 17 and the spouts 45 leading from the containers 10$^b$ and these materials will flow along the chutes 22 to the mixing bowl. When the desired materials have been obtained in the desired quantities, the frame 31 is pushed rearwardly to close the openings at the bottom of the measuring compartments and open the openings 12 leading from the containers 10 and 10$^a$ through the openings 19 in the member 16 to the measuring compartments. The valve members 42 will also be moved to the position shown in Figure 10 of the drawings.

Preferably at the bottom of each container 10 and 10$^a$ there is a glass panel 39 which permits the cook to see whether there is still any remaining material in the containers 10 and 10$^a$. If desired, the containers 10, 10$^a$ and 10$^b$ may be made of transparent or translucent material. At the top of each container there is an opening which is normally closed by a cap 40.

It will be understood that some of the containers 10 will be smaller than others and their discharge openings 12 will also be smaller, as well as their measuring compartments 13. This is so, for some materials will naturally be constantly used in smaller quantities than other materials. It is also understood that any desired number of containers 10, 10$^a$ and 10$^b$ may be provided.

The frame 31 is provided with handles 41 by which it may be operated.

What is claimed is:

1. In a cabinet, a plurality of containers, a discharge means for each of the containers, a frame mounted for moving in bearings, a bar removably secured to the frame, and means for connecting the operating bar with predetermined discharge means for operating the latter.

2. In a cabinet, a plurality of containers, a plurality of measuring compartments, one at each container, a plurality of discharge means, one at each measuring compartment, an operating bar, and means for connecting the operating bar with predetermined discharge means for operating the latter.

3. In a cabinet, a plurality of containers, a plurality of measuring compartments, one at the bottom of each container, each measuring compartment having walls with openings at the top and bottom of the measuring compartment, a plurality of discharge means, each discharge means having two members disposed for moving in the openings in a measuring compartment, there being openings out of alignment in the members of each discharge means, an operating bar, and means for connecting the operating bar with predetermined discharge means.

4. In a cabinet, a plurality of containers, a plurality of measuring compartments, one at the bottom of each container, each measuring compartment having walls with openings at the top and bottom of the measuring compartment, a plurality of discharge means, each discharge means having two members disposed for moving in the openings in a measuring compartment, there being openings out of alignment in the members of each discharge means, a frame mounted for moving in bearings, a bar removably secured to the frame, and means for connecting the bar with predetermined discharge means for operating the latter.

5. In a cabinet, a plurality of containers, a plurality of measuring compartments, one at the bottom of each container, each measuring compartment having walls with openings at the top and bottom of the measuring compartment, a plurality of discharge means, each discharge means having two members disposed for moving in the openings in a measuring compartment, there being openings out of alignment in the members of each discharge means, a frame mounted for moving in bearings, a bar removably secured to the frame, means for connecting the bar with predetermined discharge means for operating the latter, and a chute leading from below the discharge means.

6. In a cabinet, a row of containers, measuring compartments at the bottom of the containers respectively, the measuring compartments having walls, with openings in the walls at the top and at the bottom of the measuring compartments, a plurality of discharge means for the containers and operable relatively to each other, each having two members disposed for moving in the openings respectively, the members of each discharge means being provided with openings, with the opening in one member out of alignment with the opening in the other member respectively, and two chutes below the discharge means, the chutes being inclined downwardly and inwardly to a central position between the ends of the row of containers, an operating means, and means operable by the operating means for simultaneously operating a plurality of the discharge means independently of the other discharge means.

7. In a cabinet, a container having an opening at its bottom, a discharge means at the bottom of the container provided with two members, one spaced above the other, each member having an opening and one of the openings being out of alignment with the other opening, bearings without the container, guide bars disposed in the bearings, a frame connecting the guide bars, and means for detachably connecting the frame with the discharge means.

8. In a cabinet, a container having a discharge means, bearings without the container, guide bars disposed in the bearings, a frame connecting the guide bars, and means for detachably connecting the frame with the discharge means.

9. In a cabinet, a plurality of containers, a plurality of outlets, a plurality of measuring valves connected radially at their tops with the containers and leading radially at their bottoms to the outlets respectively, the measuring valves including rotatable members having ports spaced above another for communicating with the containers and the outlets respectively, an operating bar, and means on the operating bar for opening the valves.

10. In a cabinet, a row of containers, a discharge means for each of the containers, bearings, guide bars disposed in the bearings, a frame mounted on the guide bars, and means cooperating with the frame and selected discharge means for operating the latter.

SUSAN M. HAWES.